(12) United States Patent
Simonsen

(10) Patent No.: US 7,690,269 B2
(45) Date of Patent: Apr. 6, 2010

(54) CORIOLIS FLOW METER HAVING BEARINGS FOR MOUNTING THE MEASURING TUBE IN THE REGION OF THE OSCILLATION NODES

(75) Inventor: Jens Simonsen, Nordborg (DK)

(73) Assignee: Siemens Aktiengesellschaft, Munich (DE)

( * ) Notice: Subject to any disclaimer, the term of this patent is extended or adjusted under 35 U.S.C. 154(b) by 187 days.

(21) Appl. No.: 11/921,250

(22) PCT Filed: Jun. 1, 2005

(86) PCT No.: PCT/EP2005/005889

§ 371 (c)(1),
(2), (4) Date: Nov. 29, 2007

(87) PCT Pub. No.: WO2006/128483

PCT Pub. Date: Dec. 7, 2006

(65) Prior Publication Data

US 2009/0126509 A1    May 21, 2009

(51) Int. Cl.
    *G01F 1/84* (2006.01)
(52) U.S. Cl. .................................. 73/861.357
(58) Field of Classification Search ........................ None
    See application file for complete search history.

(56) References Cited

U.S. PATENT DOCUMENTS 3,927,565 A    12/1975  Pavlin et al.
5,323,658 A *  6/1994   Yao et al. ................ 73/861.357
5,691,485 A    11/1997  Endo et al.
5,979,246 A *  11/1999  Van Cleve et al. ..... 73/861.357
5,987,999 A *  11/1999  VanCleve et al. ....... 73/861.357
6,170,339 B1*  1/2001   van der Pol et al. ..... 73/861.357
6,301,974 B1*  10/2001  van der Pol et al. ..... 73/861.357
6,397,684 B1*  6/2002   Van Cleve ............. 73/861.357
6,474,175 B2*  11/2002  Davies et al. .......... 73/861.357
7,040,179 B2*  5/2006   Drahm et al. .......... 73/861.356

FOREIGN PATENT DOCUMENTS

DE    87 17 205 U1    7/1988
EP    0 317 340 B1    5/1989
EP    0 837 303 A1    4/1998

\* cited by examiner

*Primary Examiner*—Harshad Patel

(57) ABSTRACT

There is described a mass flow meter which operates on the Coriolis principle. A measuring tube is mounted in a chamber, which is provided with at least two openings for directing the medium to and from the respective end of the measuring tube. The mounting of the measuring tube is arranged between the two tube ends at an axial distance from them. It is preferably at an oscillation node of the first bending mode. The mounting arranged at an axial distance from the tube ends has the advantage that thermal expansions have virtually no influence on the internal mechanical stress conditions of the measuring tube, and consequently scarcely influence the measurement result. The mass flow meter can be used with particular advantage for gaseous media.

14 Claims, 1 Drawing Sheet

CORIOLIS FLOW METER HAVING BEARINGS FOR MOUNTING THE MEASURING TUBE IN THE REGION OF THE OSCILLATION NODES

CROSS REFERENCE TO RELATED APPLICATIONS

This application is the US National Stage of International Application No. PCT/EP2005/005889, filed Jun. 1, 2005 and claims the benefit thereof. The International Application is incorporated by reference herein in its entirety.

FIELD OF INVENTION

The invention relates to a mass flow meter, which operates according to the Coriolis principle, having at least one essentially straight measuring tube, which conducts a flowing medium.

BACKGROUND OF INVENTION

Mass flow meters with only a single straight Coriolis measuring tube have been used increasingly. Mass flow meters operating according to the Coriolis principle, which have only a single straight measuring tube, have significant advantages compared with those with two straight measuring tubes or one loop-type measuring tube. Specifically no flow dividers and flow combiners are required and a straight measuring tube is easier to manufacture than a loop-type measuring tube. Also the pressure drop is smaller and a straight measuring tube is easier to clean.

SUMMARY OF INVENTION

Mass flow meters, which operate according to the Coriolis principle and have a straight measuring tube, are however subject to a basic problem. When the Coriolis measuring tube is made to oscillate, its center of mass also oscillates. In the case of mass flow meters with two straight measuring tubes, the oscillating parts are designed to be identical and are arranged and made to oscillate in such a manner that they oscillate counter to each other. This means that the center of mass of the system remains the same and therefore the oscillating system does not have an outward effect. Therefore no oscillations are induced in a piping system, into which such a mass flow meter is integrated. Likewise oscillations induced in the meter from the piping system affect the measuring result to a lesser degree.

Since this is not possible in the case of a mass flow meter with a single straight measuring tube, complex compensation methods are required. A mass flow meter with a single straight measuring tube is known from EP 0 317 340 B 1. To impede the transmission of oscillations from the measuring tube into the piping system and vice versa, mass bodies are secured respectively to both ends of the measuring tube, to have the effect that oscillation nodes with a small radial movement result at the ends of the measuring tube. Bellows are also provided at each end of the measuring tube, to prevent thermal expansion producing changes in the mechanical stress conditions in the measuring tube due to temperature changes, thus influencing the measuring result. The structure of the mass flow meter disadvantageously means that manufacturing outlay is relatively high.

A further mass flow meter, which operates according to the Coriolis principle and has a straight measuring tube, is known from EP 0 837 303 A1. The measuring tube is arranged in a chamber, which is filled with a non-compressible fluid, for example oil. A pressure equalizing diaphragm is located in the region of one end of the measuring tube. Since there are therefore scarcely any pressure differences between the interior and environment of the measuring tube in the region of the chamber, it is possible to use a thin and therefore flexible measuring tube, even if a mass flow is to be measured at high pressure. However at the permanently tensioned end of the measuring tube there is disadvantageously a significant oscillation coupling between the measuring tube and piping system, in which the mass flow meter is integrated.

An object of the invention is to create a mass flow meter, which operates according to the Coriolis principle, which can be manufactured with relatively little outlay but still has good measuring accuracy.

To achieve this object the new mass flow meter of the type mentioned in the introduction has the features specified in the characterizing portion of independent claims. Advantageous developments are described in the dependent claims.

The invention has the advantage that no axial forces are induced in the measuring tube by way of the piping system or housing, for example due to temperature fluctuations. This is achieved in particular in that the two tube ends do not serve to support the measuring tube. In fact the mounting of the measuring tube is arranged between the two tube ends at an axial distance from them. The tube ends therefore float freely, the measuring tube can expand when temperature changes occur and this does not cause any changes in the internal mechanical stress conditions. The arrangement of the mounting at an axial distance from the tube ends advantageously also prevents mechanical oscillations of the piping system in which the mass flow meter is integrated being coupled into the measuring tube by way of the tube ends. This also has a positive effect on measuring accuracy. The chamber, in which the measuring tube is mounted, advantageously allows pressure equalization between the interior and the environment of the measuring tube. Therefore the pressure of the medium flowing through the measuring tube also has no influence on the mechanical stress conditions of the measuring tube. Also a measuring tube having a relatively thin tube wall can be used, regardless of the pressure of the medium. As a result the measuring tube is more pliable, has greater sensitivity in respect of Coriolis forces and is more insensitive to interference from outside. The mass flow meter can also be operated with a lower level of power consumption when a more flexible measuring tube is used.

The chamber, in which the measuring tube is mounted, can be subdivided here into at least two chamber spaces, with a first chamber space being provided with the opening for supplying the medium and with the first end of the measuring tube being located within it and with a second chamber space being provided with the opening for discharging the medium and with the second end of the measuring tube being located within it. This has the advantage that medium flowing through the mass flow meter is directed all the way through the measuring tube. Also the seal between the chamber openings and the respective tube end is not critical, so that a fairly large gap can be left at both ends of the measuring tube to equalize temperature changes.

An essentially tubular chamber, which is arranged concentrically in respect of the measuring tube, has the advantage that a particularly simple chamber structure is hereby achieved, which is associated with relatively low manufacturing outlay. At least a first bearing of the measuring tube can hereby be formed by an essentially disk-type diaphragm, which is arranged with its plane perpendicular to the longitudinal axis of the measuring tube, supports the measuring tube in its center and separates and seals the two chamber spaces off from one another. Such a diaphragm is relatively rigid in the radial direction but permits minor displacement in the axial direction as well as rotation of the measuring tube to a limited degree. As well as supporting the measuring tube, the diaphragm also has the function of separating and sealing the two chamber spaces off from one another, so that no part of the medium conducted through the mass flow meter can flow past the measuring tube. In order for the diaphragm advantageously to permit torsion and axial displacement of the measuring tube even to a fairly major degree, it can be provided with embossed concentric waves as a profile.

The oscillation generator can be arranged in the region of the axial center of the measuring tube. Two bearings are then advantageously provided to support the measuring tube, these being essentially located in the region of the oscillation nodes. This has the advantage that oscillations are not propagated outward or only to a minor degree by way of the bearings, since oscillation nodes are characterized by the property that there is no displacement of the measuring tube in a radial direction.

Particularly simple manufacture of the measuring tube is achieved, if it has the form of a hollow cylinder with a constant cross-section. In this instance the arrangement of the bearings is advantageously selected so that they are axially removed by respectively 20 to 25% of the length of the measuring tube from the adjacent end of the measuring tube, since the two oscillation nodes of the first bending mode are located in these regions.

Where the measuring tube is a hollow cylinder, the two bearings can be configured in a simple manner as disk-type diaphragms arranged concentrically in respect of the measuring tube, each being secured by their outer edge to the inside of the chamber and supporting the measuring tube in their respective center, with one of the two diaphragms preferably being medium-permeable. This produces a symmetrical structure of the measuring tube and mounting and allows efficient balancing out of the oscillation system.

The pressure drop resulting over the length of the measuring tube with a medium flowing through the measuring tube produces axial displacement of the measuring tube. This pressure drop is a function of the flow speed and viscosity of the flowing medium. If the axial displacement is detected by a measuring facility, it is advantageously possible to calculate the viscosity of the medium. This also makes it possible to monitor the tube bearing and to diagnose whether the measuring tube is still mounted in such a manner that it can be displaced axially or whether one of its two tube ends already incorrectly abuts against the interior wall of the chamber.

Use of the mass flow meter to measure the mass flow of a gaseous medium has the advantage that the measuring result is scarcely influenced by the medium, which also fills the hollow spaces in the chamber and therefore in the environment of the measuring tube.

BRIEF DESCRIPTION OF THE DRAWINGS

The invention, along with refinements and advantages, is described in more detail below with reference to the drawings showing an exemplary embodiment of the invention, in which.

DETAILED DESCRIPTION OF INVENTION

Figure 1:
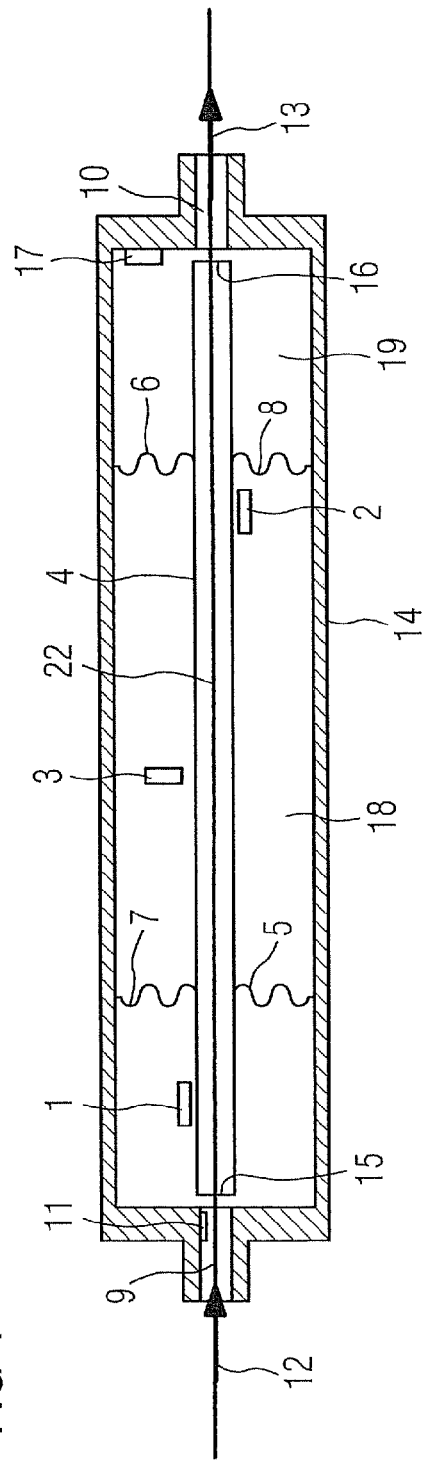
FIG. 1 shows a schematic diagram of a sensor for a mass flow meter.

FIG. 1 shows a longitudinal cross-section of a sensor for a mass flow meter. A flowing medium shown by arrows 12 and 13 is conducted in through a supply opening 9 of a chamber 14 and flows back out of the chamber 14 through a discharge opening 10. A measuring tube 4 is arranged within the chamber and is supported by two diaphragms 5 and 6 in an axially floating manner. In measuring mode the measuring tube 4 is made to oscillate perpendicular to a longitudinal axis 22 of the measuring tube 4 by an oscillation generator 3, which is located around the central region of the measuring tube 4. The deflection of the measuring tube 4 is detected using two measurement value sensors 1 and 2. Oscillation generator 3 and measurement value sensors 1 and 2 are connected to a control and evaluation facility, which is not shown in the drawing for purposes of clarity. The amplitude and phase relation of the signals generated using the measurement value sensors 1 and 2 are evaluated in this facility to determine the mass flow.

A first end 15 of the measuring tube 4 is arranged opposite the opening for supplying the medium, in such a manner that a free gap remains between the end 15 and the interior wall of the chamber. A second end 16 of the measuring tube 4 is likewise located opposite the opening 10 for discharging the medium. A gap is left between the tube end 16 and the interior wall of the chamber 14 here too. The medium can penetrate into the environment of the measuring tube 4 through the two gaps, so there is pressure equalization between the interior of the measuring tube 4 and its environment. This means that a measuring tube 4 with a relatively thin and pliable wall can be used, which improves the sensitivity of the sensor. In contrast the chamber 14 is provided with a pressure-resistant wall. The two diaphragms 5 and 6 are configured as wave diaphragms, into which concentric waves have been embossed, to allow displacement of the measuring tube 4 in an axial direction and torsion about the center point of the diaphragm. The diaphragm 6 is inserted in a sealing manner between the measuring tube 4 and the interior wall of the chamber so that two separate spaces 18 and 19 are formed in the chamber 14. This prevents some of the medium being able to flow round the measuring tube 4. In contrast there is an opening 7 in the diaphragm 5 to ensure pressure equalization. The pressure drop resulting from a flow through the measuring tube 4 is therefore present at the diaphragm 6 and causes axial displacement of the measuring tube 4, which can be evaluated in order to calculate viscosity. A sensor 17 measures the size of the gap between the tube end 16 and the interior wall of the chamber in order to monitor the operating status of the sensor of the mass flow meter and to determine whether the measuring tube 4 is incorrectly abutting against the interior wall of the chamber. At the same time the sensor 17 supplies a measurement value for the axial displacement of the measuring tube 4, which is used to calculate the viscosity of the medium directed through the measuring tube 4. A temperature sensor 11, which is arranged in the opening 9, detects the temperature of the medium. It is thus possible to compensate for the influences of temperature fluctuations on the result and the sensor can be used to determine the medium temperature as a process variable and to output it for processing or notification. As bearings for the measuring tube 4 the two diaphragms 5 and 6 are preferably axially removed by respectively 20 to 25% of the length of the measuring tube from the respective adjacent end 15 or 16 of the measuring tube 4. In this region at around 22.5% are oscillation nodes of the first bending mode of the measuring tube 4, to which the measuring tube 4 is energized by the oscillation generator 3. An oscillation node is characterized by the property that at this point the measuring tube 4 experiences no deflection in a radial direction. The two gaps between the first end 15 and the second end 16 of the measuring tube 4 and the respectively opposite interior wall of the chamber 14 mean that thermal expansion of the measuring tube 4 is permitted, without its mechanical stress conditions changing. The gaps also ensure that practically no oscillations are transmitted from the measuring tube 4 to a piping system, in which the sensor is integrated. Also oscillations of the piping system are scarcely coupled into the measuring tube 4 and can thus only influence the measuring result to a minor extent. The measuring result is therefore not a function of axial forces in the piping system, since no such forces are transmitted to the measuring tube 4. The sensor structure shown also has the advantage that the measuring tube is perfectly balanced for all medium densities, since the position of the oscillation nodes of the measuring tube 4 is practically independent of the density of the medium. The measurement is also independent of the respective pressure of the medium, since no pressure differences drop across the wall of the measuring tube 4. The structure shown also has the advantage that it allows measurement of the mass flow, the density of the medium, its temperature and viscosity all at the same time. It is hereby associated with a relatively low manufacturing outlay. The sensor is particularly suitable for measuring the mass flow of gaseous media, since the environment of the measuring tube 4 filled with the same medium only influences the oscillations to a minor extent.

Figure 2:
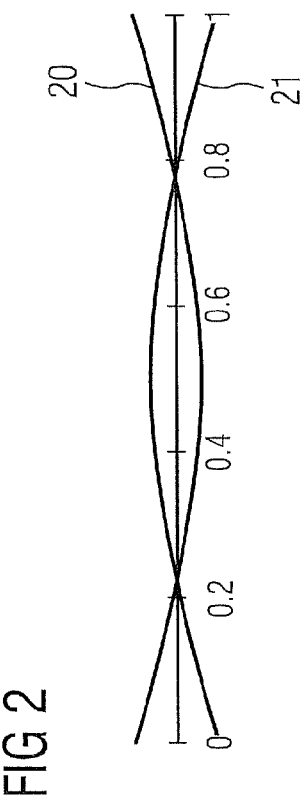
FIG. 2 shows a diagram clarifying the oscillation deflection in the first bending mode of a measuring tube.

FIG. 2 shows two bending lines 20 and 21 of the measuring tube 4 in the first bending mode over the normalized measuring tube length. It can be seen clearly that two oscillation nodes are located at around 0.225 and 0.775 of the measuring tube length. The mounting of the measuring tube is preferably provided at these nodes, since no deflection of the measuring tube axis and therefore no displacement in a radial direction takes place here. The pattern of the bending lines 20 and 21 has mirror symmetry in respect of a plane, which runs half-way along the measuring tube length perpendicular to its longitudinal axis. The Coriolis forces, which result with a mass flow through the measuring tube, mean that these oscillations are overlaid by an oscillation roughly in the nature of the second bending mode, which runs with point symmetry in respect of a point half-way along the measuring tube length, the bending lines 20 and 21. The resulting phase displacement of the oscillation can easily be detected and evaluated by the measurement value sensors 1 and 2 shown in FIG. 1.

The invention claimed is:

1. A mass flow meter, comprising:
a measuring tube;
a vibration generator, wherein the vibration generator is essentially arranged in an axial center of the measuring tube to energize the measuring tube to oscillate in a first bending mode;
a measurement value sensor to detect Coriolis forces;
a chamber, wherein the measuring tube is mounted in the chamber, and wherein the chamber has a first opening and a second opening to direct a medium to and from respective ends of the measuring tube; and
a first bearing and a second bearing for mounting the measuring tube, wherein the first and second bearings are located essentially in the region of oscillation nodes at an axial distance from the two tube ends respectively,
wherein a first end of the measuring tube is arranged opposite the first opening such that a first free gap remains between the first end and the chamber, and
wherein a second end of the measuring tube is arranged opposite the second opening such that a second free gap remains between the second end and the chamber.

2. The mass flow meter as claimed in claim 1, wherein the measuring tube is essentially straight, and wherein the measuring tube conducts a flowing medium.

3. The mass flow meter as claimed in claim 2, wherein the mass flow meter operates according to the Coriolis principle.

4. The mass flow meter as claimed in claim 2, wherein the chamber is subdivided into at least two chamber spaces, wherein a first chamber space has the first opening to supply the medium, wherein the first end of the measuring tube is located within the first chamber space, and wherein a second chamber space has the second opening to discharge the medium, wherein the second end of the measuring tube is located within the second chamber space.

5. The mass flow meter as claimed in claim 4, wherein the chamber is essentially tubular and is arranged concentrically in respect of the measuring tube.

6. The mass flow meter as claimed in claim 5, wherein the first bearing of the measuring tube is formed by an essentially disk-type diaphragm, wherein the diaphragm is arranged with the plane perpendicular to the longitudinal axis of the measuring tube, and wherein the diaphragm supports the measuring tube in the center of the diaphragm and separates and seals the two chamber spaces off from one another.

7. The mass flow meter as claimed in claim 6, wherein the diaphragm has embossed concentric waves.

8. The mass flow meter as claimed in claim 7, wherein the measuring tube is a form of a hollow cylinder, and wherein the two bearings are axially removed by respectively 20 to 25% of the length of the measuring tube from the adjacent end of the measuring tube.

9. The mass flow meter as claimed in one of claim 6, wherein a device detects an axial displacement of the measuring tube.

10. The mass flow meter as claimed in claim 2, wherein the measuring tube is a form of a hollow cylinder, and wherein the two bearings are axially removed by respectively 20 to 25% of the length of the measuring tube from the adjacent end of the measuring tube.

11. The mass flow meter as claimed in claim 10, wherein the two bearings are disk-type diaphragms arranged concentrically in respect of the measuring tube, and wherein each diaphragm is secured by an outer edge of the diaphragm to an inside of the chamber, wherein the diaphragm support the measuring tube in the center.

12. The mass flow meter as claimed in claim 11, wherein one diaphragm of the two diaphragms is medium-permeable.

13. The mass flow meter as claimed in claim 1, wherein the medium is gaseous.

14. The mass flow meter as claimed in claim 1, wherein the measurement value sensor detects Coriolis forces and oscillations based on Coriolis forces.

* * * * *